United States Patent
Desclos et al.

(10) Patent No.: US 11,700,042 B2
(45) Date of Patent: Jul. 11, 2023

(54) COMMUNICATION LOAD BALANCING USING DISTRIBUTED ANTENNA BEAM STEERING TECHNIQUES

(71) Applicant: Ethertronics, Inc., San Diego, CA (US)

(72) Inventors: Laurent Desclos, San Diego, CA (US); Jeffrey Shamblin, San Marcos, CA (US); Olivier Pajona, Antibes (FR)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 482 days.

(21) Appl. No.: 16/693,908

(22) Filed: Nov. 25, 2019

(65) Prior Publication Data

US 2020/0186219 A1    Jun. 11, 2020

Related U.S. Application Data

(63) Continuation of application No. 15/016,245, filed on Feb. 4, 2016, now Pat. No. 10,491,282, which is a continuation-in-part of application No. 14/109,837, filed on Dec. 17, 2013, now Pat. No. 9,609,654.

(60) Provisional application No. 62/112,090, filed on Feb. 4, 2015, provisional application No. 61/738,325, filed on Dec. 17, 2012.

(51) Int. Cl.
| | |
|---|---|
| *H04B 7/06* | (2006.01) |
| *H04B 7/10* | (2017.01) |
| *H04W 36/22* | (2009.01) |
| *H04W 16/28* | (2009.01) |
| *H04W 36/06* | (2009.01) |
| *H04W 36/32* | (2009.01) |
| *H04W 72/044* | (2023.01) |

(52) U.S. Cl.
CPC ............ *H04B 7/0617* (2013.01); *H04B 7/10* (2013.01); *H04W 36/22* (2013.01); *H04W 16/28* (2013.01); *H04W 36/06* (2013.01); *H04W 36/32* (2013.01); *H04W 72/046* (2013.01)

(58) Field of Classification Search
CPC ....... H04B 7/0617; H04B 7/10; H04W 36/22; H04W 36/06; H04W 36/32; H04W 16/28; H04W 72/046
See application file for complete search history.

(56) References Cited

U.S. PATENT DOCUMENTS

| | | | | |
|---|---|---|---|---|
| 4,217,583 | A * | 8/1980 | Hiller | G01S 13/5244 342/149 |
| 5,661,489 | A * | 8/1997 | Baker | H01Q 3/24 342/383 |
| 5,684,672 | A * | 11/1997 | Karidis | H01Q 1/088 343/702 |
| 6,173,014 | B1 * | 1/2001 | Forssen | H04L 1/06 375/267 |

(Continued)

*Primary Examiner* — Jenee Holland
(74) *Attorney, Agent, or Firm* — Dority & Manning, P.A.

(57) ABSTRACT

A load balancing method for cellular communication systems and communication systems in general is described where beam steering antenna systems on the client or user side of the communication link are used to optimize load balancing among the base stations or nodes. A system controller containing an algorithm is implemented to control the radiation modes from the client or user devices to assign the client or user devices to the various base stations or nodes and to dynamically vary the network load across the cellular or communication system.

10 Claims, 12 Drawing Sheets

(56) References Cited

U.S. PATENT DOCUMENTS

| Patent/Publication No. | Date | Inventor(s) | Classification |
|---|---|---|---|
| 6,249,801 B1 | 6/2001 | Zisapel et al. | |
| 6,259,730 B1 * | 7/2001 | Solondz | H04B 7/0671 375/232 |
| 6,718,359 B2 | 4/2004 | Zisapel et al. | |
| 6,765,536 B2 | 7/2004 | Phillips et al. | |
| 6,834,039 B1 * | 12/2004 | Kelly | H01Q 3/08 370/321 |
| 6,987,493 B2 | 1/2006 | Chen | |
| 7,068,234 B2 | 6/2006 | Sievenpiper | |
| 7,215,289 B2 | 5/2007 | Harano | |
| 7,911,402 B2 | 3/2011 | Rowson et al. | |
| 7,984,148 B2 | 7/2011 | Zisapel et al. | |
| 8,362,962 B2 | 1/2013 | Rowson et al. | |
| 8,428,610 B2 | 4/2013 | Chowdhury et al. | |
| 8,446,318 B2 | 5/2013 | Ali et al. | |
| 8,648,755 B2 | 2/2014 | Rowson et al. | |
| 9,065,496 B2 | 6/2015 | Rowson et al. | |
| 9,071,301 B2 | 6/2015 | Khojastepour | |
| 9,231,669 B2 | 1/2016 | Desclos et al. | |
| 9,240,634 B2 | 1/2016 | Rowson et al. | |
| 9,356,872 B2 | 5/2016 | Uzelac et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,590,703 B2 | 3/2017 | Desclos et al. | |
| 9,755,580 B2 | 9/2017 | Desclos et al. | |
| 2003/0017853 A1 * | 1/2003 | Kanamaluru | H04W 16/28 455/562.1 |
| 2003/0220109 A1 * | 11/2003 | Jami | H04W 48/20 455/437 |
| 2004/0005890 A1 * | 1/2004 | Holma | H04B 17/309 455/67.11 |
| 2004/0066745 A1 | 4/2004 | Joe | |
| 2004/0077354 A1 * | 4/2004 | Jason | H04W 24/02 455/67.11 |
| 2004/0192222 A1 * | 9/2004 | Vaisanen | H04B 1/3805 455/73 |
| 2004/0267920 A1 | 12/2004 | Hydrie et al. | |
| 2005/0181832 A1 * | 8/2005 | Ishii | H04L 1/20 455/67.11 |
| 2006/0033659 A1 * | 2/2006 | Strickland | H04B 7/18508 342/372 |
| 2006/0068849 A1 * | 3/2006 | Bernhard | H04W 16/28 455/562.1 |
| 2006/0084441 A1 * | 4/2006 | Dowling | H04W 24/04 455/445 |
| 2006/0166699 A1 * | 7/2006 | Aghvami | H04L 47/824 455/552.1 |
| 2006/0241396 A1 * | 10/2006 | Fabian | A61B 5/06 340/572.1 |
| 2006/0264192 A1 * | 11/2006 | Kuo | H04W 52/367 455/232.1 |
| 2007/0042717 A1 * | 2/2007 | Alexiou | H04B 7/0647 455/69 |
| 2007/0217433 A1 * | 9/2007 | Doppler | H04B 7/0842 370/400 |
| 2008/0001829 A1 | 1/2008 | Rahola | |
| 2008/0151812 A1 * | 6/2008 | Camp, Jr. | H04B 7/2681 370/320 |
| 2008/0233953 A1 * | 9/2008 | Stefani | H04W 92/02 455/431 |
| 2009/0023453 A1 * | 1/2009 | Hu | H04L 12/189 455/452.1 |
| 2009/0034469 A1 * | 2/2009 | Kim | H04W 36/14 370/331 |
| 2009/0305717 A1 * | 12/2009 | Ludovico | H04W 16/18 455/453 |
| 2009/0323530 A1 * | 12/2009 | Trigui | H04W 16/08 370/252 |
| 2010/0020702 A1 * | 1/2010 | Wong | H04L 41/5009 370/252 |
| 2010/0081448 A1 * | 4/2010 | Wong | H04W 72/121 455/452.1 |
| 2010/0141530 A1 * | 6/2010 | McMahon | H01Q 5/378 342/417 |
| 2010/0238075 A1 | 9/2010 | Pourseyed | |
| 2010/0279616 A1 * | 11/2010 | Jin | H04W 16/28 455/62 |
| 2010/0296591 A1 * | 11/2010 | Xu | H04B 7/0684 375/259 |
| 2011/0064018 A1 * | 3/2011 | Hottinen | H04W 72/046 370/329 |
| 2011/0158190 A1 * | 6/2011 | Kuwahara | H04L 5/0062 370/329 |
| 2012/0057622 A1 * | 3/2012 | Kimura | H04W 56/0045 375/259 |
| 2012/0086616 A1 * | 4/2012 | Park | H01Q 3/247 343/725 |
| 2012/0134279 A1 * | 5/2012 | Tamaki | H04B 7/0452 370/248 |
| 2012/0196528 A1 * | 8/2012 | Kazmi | H04W 52/46 455/9 |
| 2012/0280871 A1 * | 11/2012 | Shamblin | H01Q 5/392 343/745 |
| 2012/0307756 A1 * | 12/2012 | Collings | H04W 16/02 370/329 |
| 2012/0320766 A1 * | 12/2012 | Sridhar | H04W 52/0206 370/252 |
| 2013/0045692 A1 * | 2/2013 | Waz-Ambrozewicz | H04B 7/0695 455/562.1 |
| 2013/0053078 A1 * | 2/2013 | Barbieri | H04W 72/27 455/509 |
| 2013/0094393 A1 * | 4/2013 | Cheng | H04W 24/00 370/252 |
| 2013/0109449 A1 | 5/2013 | Desclos | |
| 2013/0235807 A1 * | 9/2013 | Lee | H04L 1/0026 370/329 |
| 2013/0329612 A1 * | 12/2013 | Seo | H04W 72/082 370/280 |
| 2014/0050089 A1 * | 2/2014 | Zhang | H04W 28/08 370/232 |
| 2014/0099982 A1 * | 4/2014 | Desclos | H04B 17/345 455/501 |
| 2014/0162566 A1 * | 6/2014 | Desclos | H04B 7/0404 455/575.7 |
| 2014/0185721 A1 * | 7/2014 | Pajona | H04B 7/0689 375/347 |
| 2014/0242934 A1 * | 8/2014 | Guo | H04B 1/16 455/273 |
| 2014/0247797 A1 * | 9/2014 | Monzen | H04L 1/0015 370/329 |
| 2014/0269862 A1 * | 9/2014 | Krewski | H04L 27/2626 375/219 |
| 2014/0328242 A1 * | 11/2014 | Tong | H04W 72/046 370/312 |
| 2014/0334565 A1 * | 11/2014 | Tzanidis | H04B 7/0456 375/267 |
| 2014/0349658 A1 * | 11/2014 | Lin | H04W 64/006 455/441 |
| 2014/0376534 A1 * | 12/2014 | Pajona | H04W 24/02 370/338 |
| 2016/0066312 A1 * | 3/2016 | Centonza | H04W 36/00835 370/329 |
| 2016/0066330 A1 * | 3/2016 | Centonza | H04W 72/0453 370/329 |
| 2016/0226729 A1 * | 8/2016 | Ramachandra | H04W 36/0088 |
| 2018/0013476 A1 * | 1/2018 | Ramachandra | H04B 7/063 |
| 2019/0109692 A1 * | 4/2019 | Gao | H04W 72/04 |

* cited by examiner

COMMUNICATION LOAD BALANCING USING DISTRIBUTED ANTENNA BEAM STEERING TECHNIQUES

CROSS-REFERENCE TO RELATED APPLICATIONS

This application is a continuation of U.S. application Ser. No. 15/016,245, filed Feb. 4, 2016, titled "COMMUNICATION LOAD BALANCING USING DISTRIBUTED ANTENNA BEAM STEERING TECHNIQUES," which is a continuation in part of commonly owned U.S. Ser. No. 14/109,837, filed Dec. 17, 2013, titled "BEAM STEERING TECHNIQUES APPLIED TO CELLULAR SYSTEMS"; which claims benefit of U.S. Provisional Application Ser. No. 61/738,325, filed Dec. 17, 2012; and this application further claims benefit of priority with U.S. Provisional Application Ser. No. 62/112,090, filed Feb. 4, 2015;

the contents of each of which are hereby incorporated by reference.

FIELD OF INVENTION

This invention relates generally to the field of wireless communication; and more particularly, to dynamic load balancing of a communication network using beam steering antenna systems at the client or user side of the communication link.

BACKGROUND

Data centric mobile devices and applications are putting capacity constraints on cellular and wireless local area network (WLAN) communication systems as more users move to these higher data rate devices. The growth of video file sharing is increasing the data rate requirements for both uplink and downlink in the cellular and WLAN environment. As a result, new optimization techniques are required to load balance the communication network to maintain system capacity and reduce the need of adding additional base terminals.

Current and future cellular communication systems will require higher performance from the antenna systems on the mobile or user end to improve system capacity and optimize load balance across the base terminals or nodes. As new generations of handsets, gateways, and other wireless communication devices become embedded with more applications and the need for bandwidth becomes greater, new antenna systems will be required to optimize link quality over larger bandwidths. Specifically, better control of the radiated field from the antenna system on the mobile side of the communication link will be required to provide better communication link quality for an antenna system tasked to cover multiple frequency bands. Control and optimization of radiated performance of subscriber devices in the cellular system can be implemented to load balance the existing networks.

As more subscribers migrate to higher data rate applications and devices, there will be a greater need to dynamically adjust uplink and downlink radiated performance per subscriber per cell in a network. Antenna beam steering techniques are well known and utilized on the base terminal side of the cellular communication link, but are currently missing from the mobile side primarily due to size constraints of the devices in use. For example, current cell phones, smart phones, and tablet devices are not large enough nor have the internal volume available to support multi-element antenna arrays needed to effectuate traditional beam steering techniques.

SUMMARY

A load balancing method for cellular communication systems and communication systems in general is described wherein beam steering antenna systems on the client or user side of the communication link are used to optimize load balancing among the base stations or nodes (i.e. the "network"). A system controller including an algorithm is implemented to control the radiation modes from the client or user devices (for example, cell phones, smart phones, tablet devices, and on the like) to assign the client or user devices to the various base stations or nodes and to dynamically vary the network load across the cellular or communication system network.

BRIEF DESCRIPTION OF THE DRAWINGS

The claimed invention can be further understood upon a thorough review of the following detailed description in conjunction with the appended drawings, wherein:

DETAILED DESCRIPTION

Figure 1A:
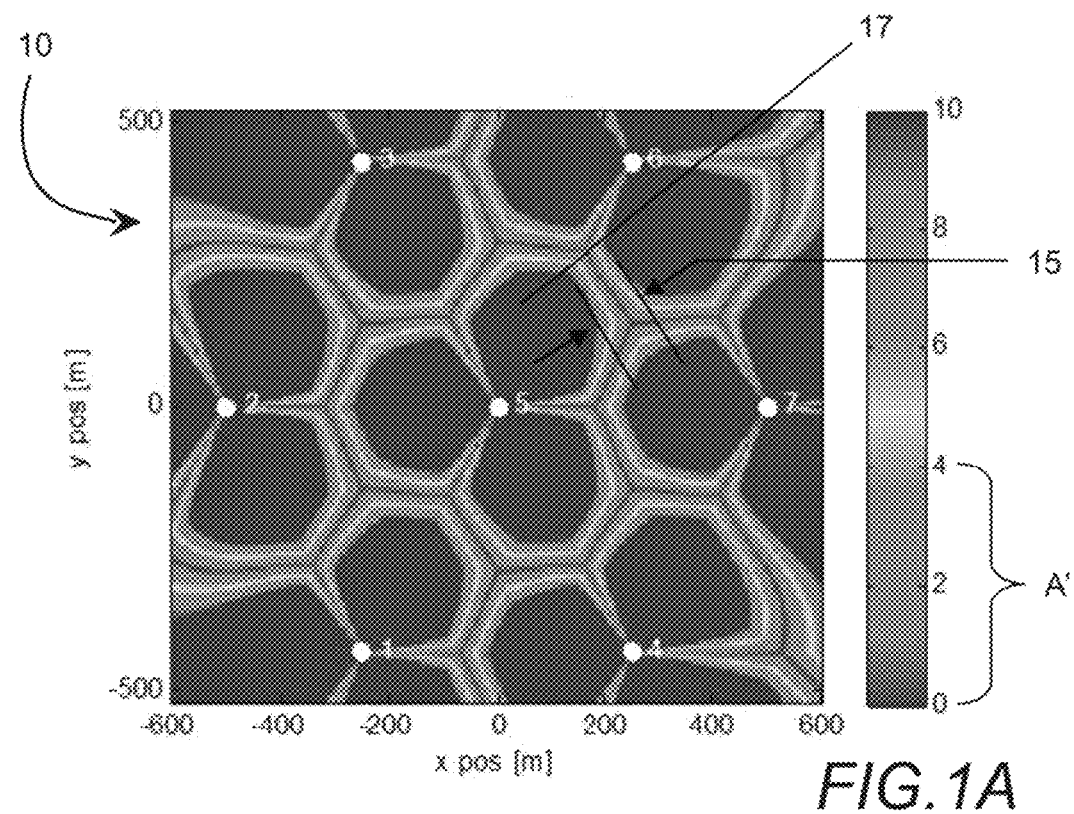
FIG. 1A shows a signal strength profile of a cellular network in accordance with an illustrated embodiment.

In the instant disclosure, for purposes of explanation and not limitation, details and descriptions are set forth in order to provide a thorough understanding of the claimed invention. However, it will be apparent to those skilled in the art that the claimed invention may be practiced in other embodiments that depart from these details and descriptions without departing from the spirit and scope of the invention. Certain embodiments will be described below with reference to the drawings wherein illustrative features are denoted by reference numerals.

In the following description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Now, a load balancing method for cellular communication systems and communication systems in general is described, wherein beam steering antenna systems on the client or user side of the communication link are used to optimize load balancing among the base stations or nodes (i.e. the "network"). A system controller including an algorithm is implemented to control the radiation modes from the client or user devices (for example, cell phones, smart phones, tablet devices, and on the like) to assign the client or user devices to the various base stations or nodes and to dynamically vary the network load across the cellular or communication system network. Client-side beam steering antennas are described in commonly owned U.S. Ser. No. 14/965,881, filed Dec. 10, 2015, titled "ANTENNA AND METHOD FOR STEERING ANTENNA BEAM DIRECTION FOR WIFI APPLICATIONS"; U.S. Ser. No. 14/144,461, filed Dec. 30, 2013, and titled "ANTENNA AND METHOD FOR STEERING ANTENNA BEAM DIRECTION"; U.S. Ser. No. 13/726,477, filed Dec. 24, 2012, titled "ANTENNA AND METHOD FOR STEERING ANTENNA BEAM DIRECTION", now U.S. Pat. No. 8,648,755, issued Feb. 2, 2011; U.S. Ser. No. 13/029,564, filed Feb. 17, 2011, titled "ANTENNA AND METHOD FOR STEERING ANTENNA BEAM DIRECTION", now U.S. Pat. No. 8,362,962, issued Jan. 29, 2013; and U.S. Ser. No. 12/043,090, filed Mar. 5, 2008, titled "ANTENNA AND METHOD FOR STEERING ANTENNA BEAM DIRECTION", now U.S. Pat. No. 7,911,402, issued Mar. 22, 2011; the contents of each of which is hereby incorporated by reference.

Each of these references describes a client-side beam steering antenna technique (beam steering using the antenna system of the device) wherein a single antenna is capable of generating multiple radiating modes. This is effectuated with the use of offset parasitic elements that alter the current distribution on the driven antenna as the reactive load on the parasitic is varied. This beam steering technique, wherein multiple modes are generated, is referred to as a "modal antenna" technique, and an antenna configured to alter radiating modes in this fashion will be referred to herein as a "modal antenna". This antenna architecture solves the problem associated with a lack of volume in mobile devices to accommodate antenna arrays needed to implement more traditional beam steering hardware.

The above-described modal antenna technique can be implemented in mobile and fixed communication devices across a network and used to address and optimize the load distribution of users and data across the network. Modal antennas that are integrated into the mobile devices on a network provide the capability to direct antenna gain of the mobile device to one or more preferred base terminals or nodes within range of the mobile device. Compared to a conventional passive antenna used with a mobile device, the modal antenna can provide improved antenna gain performance in the direction of multiple base terminals or nodes, with this capability being used to load balance a network when a subset of, or all of, the mobile and fixed devices on a network possess this capability.

The following embodiments describe systems and methods for load balancing in a communication system. Hardware and algorithm components along with a system controller are described which enable this novel load balancing technique. A beam steering technique may be implemented with a wide variety of current load balancing techniques that may be software implementations. For example, a common approach used in communication network load balancing is to define a balance index which is used to measure the balance of resources in a system. The balance index was first introduced by D. Chiu and R Jain "Analysis of the increase and Decrease Algorithms for Congestion Avoidance in Computer Networks"; Computer Networks and ISDN Systems, Vol. 17, no. 1, pp 1-14, 1989. It is defined as $$\zeta_1 = \frac{\left(\sum_i \rho_i\right)^2}{K \sum_i \rho_i^2},$$

where K is the number of neighboring base terminals over which the load can be distributed, and ρi are load vectors associated with each base terminal.

The load vectors vary between 0 and 1, and if all base terminals have the same load level, then $\xi_1=1$. As additional wireless terminals enter a cellular network or as wireless terminals move in relation to the base terminals, the load vectors can be surveyed and the wireless terminal can be assigned to a base terminal to attempt to maintain a balanced loading of the network. The embodiments described herein may be used to more optimally connect a wireless terminal to a base terminal during the load balancing process and to provide better communication link performance between the wireless terminal and multiple base terminals, which will result in more wireless terminal/base terminal pairings or options as a load balancing process is implemented. The balance index of the network may be calculated for several beam steering configurations spread across a large number of wireless terminals, and the beam steering states may be selected to optimize for network load.

As used herein "base terminal" includes a network side base station tower or other network terminal.

The term "wireless terminal" includes wireless devices, repeaters, access points, and other client-side terminals and subscriber devices that are configured to connect with base terminals via a communication link.

Another common approach implemented in load balancing schemes is termed the max Signal to Interference and Noise Ratio (max-SINR) approach, where SINR is surveyed across the population of wireless terminals on a network, and wireless terminals are distributed across base terminals to maximize SINR performance. This approach will ensure good connectivity for the wireless terminals but does not take into account data rate for the wireless terminals, because a good SINR may be achieved for a wireless terminal as it is assigned to a base terminal, but the selected base terminal might already be serving a large number of wireless terminals that will impact the network resources that can be assigned to the new wireless terminal. In this scenario, the beam steering technique described herein will provide better performance across the population of wireless terminals due to the ability to direct the antenna radiation pattern gain maxima in a direction of a less loaded base terminal or node where equivalent SINR can be achieved compared to a more heavily loaded base terminal.

The ability to beam steer the antenna system associated with a wireless terminal in a cellular or node based network will result in several benefits compared to a passive antenna associated with the wireless terminal: improved signal strength of the communication link between wireless terminal and base terminal, a potential increase in base terminals that can be accessed by a wireless terminal during the load balancing process, and the ability to provide a more equal link quality between base terminal and wireless terminal at some instances due to beam steering functionality Embodiments herein describe a load balancing scheme based upon beam steering attributes assigned to mobile and fixed communication devices (subscribers) on a cellular or other node based network where the beam steering function of the antenna system at the subscribers are commanded and controlled from a system controller on the network. An algorithm is implemented in a system controller to control antenna system beam state functionality to load balance cells or nodes associated with the communication network. Optimizing antenna system gain performance in the direction of intended communication as well as reducing antenna system gain performance in the direction of interferers are also considered and optimized during the load balancing process. A subset of subscriber devices, or all subscriber devices, may incorporate antenna beam steering systems within the network, with maximum benefit occurring when all subscriber devices provide beam steering capability. The uplink and downlink channels of the network are used to provide subscriber antenna system status to the network and for the network to send beam steering commands to the subscribers. This load balancing technique may be implemented on both networks that have beam steering antenna systems at the base terminals or nodes, and on networks that have fixed antenna systems at the base terminals or nodes.

In some embodiments, in a multi-cell wireless communication network, one or more subscriber communication devices have beam steering antenna systems capable of generating multiple radiation modes. A system controller comprised of a processor and algorithm is part of the network and provides the control and monitoring function for the subscribers. Subscriber loading per cell may be monitored by the system controller along with the number of subscribers associated with each cell. The algorithm implements a decision process to assign subscribers to specific cells based upon cell loading. Specifically, the subscriber devices that contain beam steering antenna systems are queried, and communication link performance with cells in the vicinity of the subscriber device for radiation modes of the antenna system are determined using a metric such as Signal to Interference and Noise Ratio (SINR), Channel Quality Indicator (CQI), Receive Signal Strength Indicator (RSSI), Bit Error Rate (BER), or any other metric that would be similarly implemented by those having skill in the art. A matrix consisting of subscriber device performance per radiation mode for cells may be developed and used to assign subscribers to cells to spread or optimize the loading across the network. Antenna beam state for subscribers may become a key metric to track, prior to handover of the subscriber between cells. This technique may be implemented to provide load balance optimization for the cells in a network for both uplink and downlink operation.

In some embodiments, all subscriber communication devices on a multi-cell wireless communication network have beam steering antenna systems capable of generating multiple radiation modes. This results in an optimized network where all subscriber devices may be monitored for antenna beam steering performance with multiple cells to assess best network load balancing.

In some embodiments, a multi-cell wireless communication network, wherein one or more subscriber communication devices each with beam steering antenna systems capable of generating multiple radiation modes, the network may possess a fault correction mode where radiation modes for subscriber devices may be selected to off-load a cell that has a failure or partial failure mechanism. A system controller comprised of a processor and algorithm is part of the network and provides the control and monitoring function for the subscribers. When a fault is detected, for example, with hardware associated with a cell in the network that can affect communication link performance between the cell and subscribers, the controller with algorithm may implement a failure correction mode where subscribers are off-loaded to adjacent or other cells. The antenna beam steering systems associated with subscribers are surveyed by the controller and antenna beam steering mode and cell pairings may be implemented to avoid use of the cell containing the fault.

In some embodiments, the algorithm residing in the system controller may be configured to implement a decision process such that a subset of subscribers receive preference over other subscribers as the load balancing process is applied to the network. The preference of the subset of subscribers results in improved communication performance, for example, higher data rate, with this preference applied by selecting radiation modes for the subscribers on the network that provides improved connections to cells within the network. This process implemented by the algorithm assigns priority to load balancing the network and improving communication link performance of a subset of subscribers at the expense of the rest of the subscribers on the network. For example, a radiation mode selection for a subscriber may be selected to improve the connection with a selected base terminal or node, with the communication link improvement achieved from the radiation mode selection resulting in increased SINR such that a higher order of modulation may be achieved, resulting in a higher data rate. A subscriber in the same cell and connected to the same base terminal or node that is not part of the subset of subscribers slated for improved performance may be commanded by the controller, based on the algorithm, to select a radiation mode that provides optimal communication link performance, allowing for a specific data rate applied to the subscriber. Network resources may be freed up for preferred subscribers by optimizing radiation mode performance for all subscribers.

In some embodiments, the algorithm included in the system controller may be configured to monitor the movement of subscribers and implement a decision process that will anticipate the handover between cells and ensure maximum link quality for a subscriber along his or her trajectory. For example, a radiation mode selection for a subscriber may be selected to improve the connection with a next base terminal or node that the subscriber will go through in conjunction with the load balancing process.

In some embodiments, the algorithm included in the system controller may be configured to implement a decision process such that communication link performance is equalized across the entire population of subscribers on the network as the load balancing process is applied to the network. The process results in an attempt to equalize communication link performance across the population of subscribers, with a result being that network resources are unevenly distributed across the subscribers. For example, as the network is configured to load balance the cells within the network by radiation mode selection of the individual subscriber devices, more network resources will need to be directed to subscribers in regions of cells where communication link performance is degraded compared to other regions of cells. Additional blockage of communication signals due to walls, buildings, or other obstructions and/or increased range between the base terminal or node and the subscriber may result in a weaker signal compared to other portions of a cell that are closer to the base terminal or node or where there are fewer blockages from obstructions.

In some embodiments, the algorithm included in the system controller may use one or more metrics, such as, but not limited to, predicted SINR, RSSI, or BER average over a certain period time for all subscribers in order to implement a decision process such that communication link performance may be equalized over a certain period across the entire population of subscribers on the network as the load balancing process is applied to the network.

In some embodiments, a multi-cell wireless communication network includes one or more subscriber communication devices having beam steering antenna systems capable of generating multiple radiation modes and the base terminals also having antennas coupled to them that are capable of generating multiple radiation modes. The radiation modes for the antennas coupled to the base terminals may be the result of standard antenna array techniques where multiple antenna elements are spaced a set distance apart and fed in unison using a feed structure to allow for connection of the array to a single transceiver port. A system controller comprised of a processor and algorithm is part of the network and provides the control and monitoring function for the subscribers. Subscriber loading per cell may be monitored by the system controller along with the number of subscribers associated with each cell. The algorithm may implement a decision process to assign subscribers to specific cells based upon cell loading. Specifically, the subscriber devices that contain beam steering antenna systems may be queried, and communication link performance with cells in the vicinity of the subscriber device for radiation modes of the antenna system may be determined, using a metric such as SINR, CQI, RSSI, BER, or other suitable metric. A matrix consisting of subscriber device performance per radiation mode for cells may be developed and used to assign subscribers to cells to spread or optimize the loading across the network. Antenna beam state for subscribers becomes a key metric to track, prior to handover of a subscriber between cells. This technique may be implemented to provide load balance optimization for the cells in a network for both uplink and downlink operation.

Figure 1B:
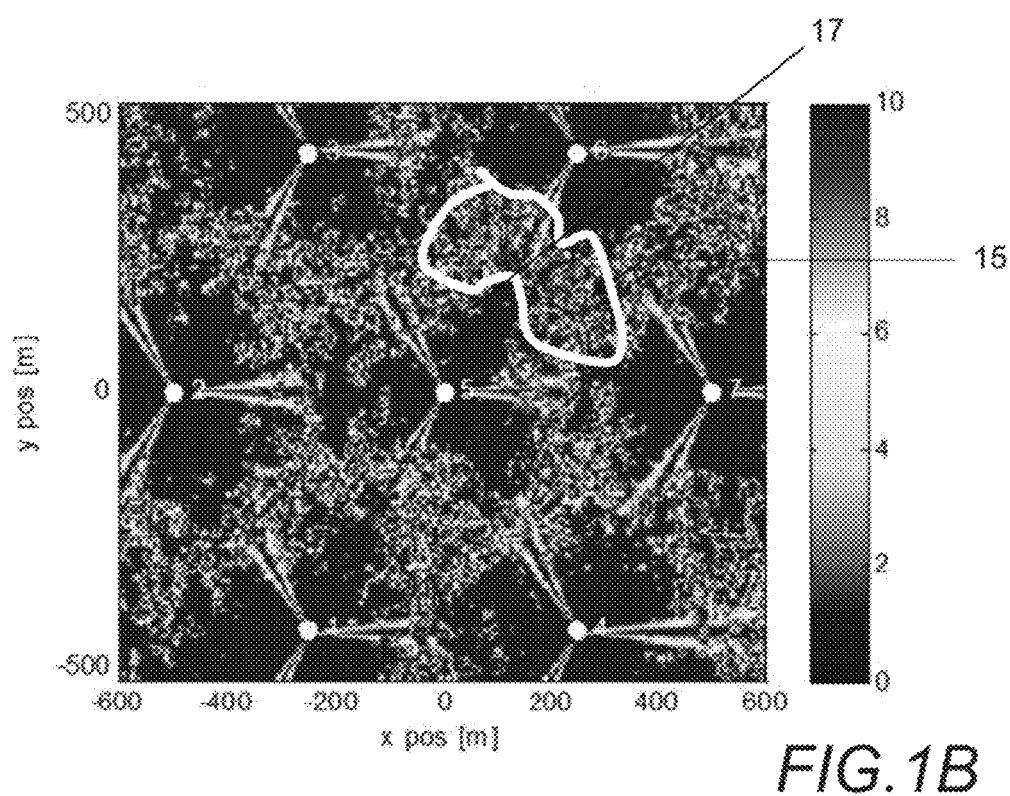
FIG. 1B shows another signal strength profile of a cellular network in accordance with an illustrated embodiment.

Now turning to the drawings, FIGS. 1A and 1B illustrate a signal strength profile of a cellular network 10. FIG. 1A shows an exemplary signal strength profile of the cells, operated by base terminals 1 to 7, where macroscopic fading in SINR difference is considered, with caxis being limited to 10 dB. This provides a clearer representation of the radiated signals in the individual cells. For example, region 17 has high SINR for the base terminal or node 5. A soft hand-off (or handover) region 15 is denoted in FIG. 1A and represents an area where a wireless terminal can connect to two or more base terminals, for example, base terminals 5 and 6. A scale is provided denoting SINR, and a "soft hand-off region" is defined as regions where signal strength from two or more base terminals are within a set range, for example range A' between 0 and 4. A more accurate representation of the network is shown in FIG. 1B where macroscopic and shadow fading are considered. This type of signal strength variation in cells is more realistic and representative of actual system characteristics. The soft hand-off (or handover) region 15 denoted in FIG. 1B by an outlined shape represents a broad area where a wireless terminal can connect to two or more base terminals, for example, base terminals 5 and 6. A high SINR region 17 is shown with respect to base terminal 5. Base terminals are denoted 1 through 7 as in FIG. 1A, above.

Figure 2A:
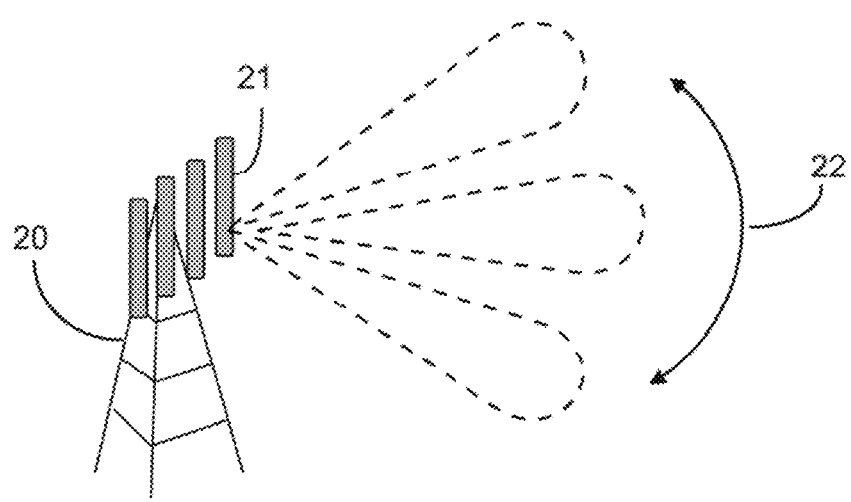
FIG. 2A shows a base terminal tower with an antenna array in accordance with an illustrated embodiment.
Figure 2B:
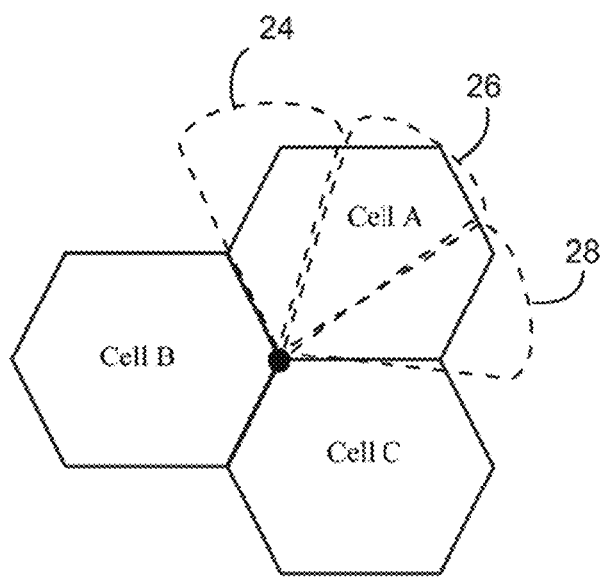
FIG. 2B shows multiple smaller regions of a cell of a cellular network in accordance with an illustrated embodiment.

FIG. 2A illustrates a base terminal tower 20 with an antenna array 21. The antenna array may implement a standard antenna array technique known in the art to scan the radiation pattern 22 in various directions in the cell (i.e. base station terminal can implement a form of antenna beam steering). The antenna array 21 may be used to break up a cell into multiple smaller regions, for example, regions 24, 26, and 28 of cell A shown in FIG. 2B, illustrating an idealized cell coverage from an array.

Figure 3A:
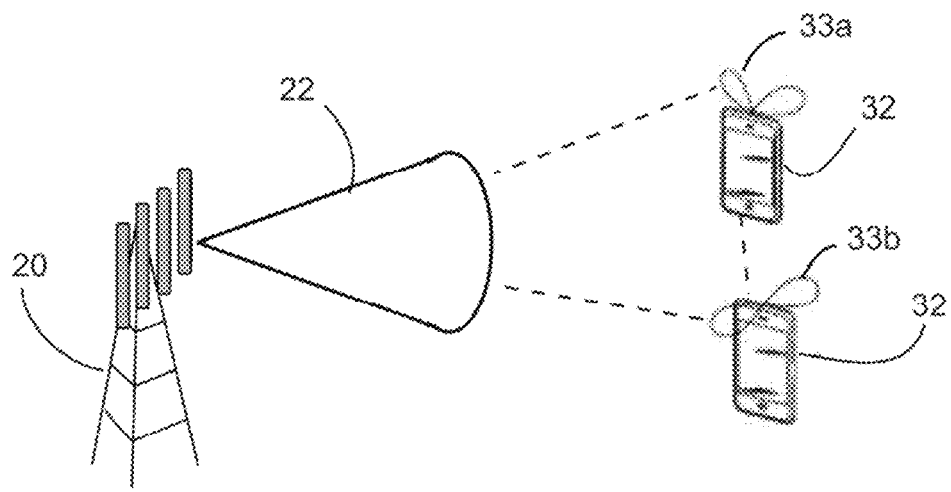
FIG. 3A shows a base terminal antenna system having a fixed radiation pattern in accordance with an illustrated embodiment.

FIGS. 3(A-B) illustrate, in accordance with some embodiments, a technique where the base terminal antenna system 20 has a fixed radiation pattern 22, but the antenna systems 30 (not shown) associated with the wireless terminals 32 (e.g., mobile phones, smart phones, tablets, and on the like) have a beam steering capability. This capability may be realized using a modal antenna, which is capable of generating multiple radiation patterns from a single antenna structure. For example, FIG. 3A shows the wireless terminal 32 with a first radiation mode 33a, and the wireless terminal 32 (same device) configured with a second radiation mode 33b Of the antenna system. While the antenna systems of individual devices can be configured in one of a plurality of modes, the illustrated embodiment contemplates a two-mode modal antenna for simplification.

Figure 3B:
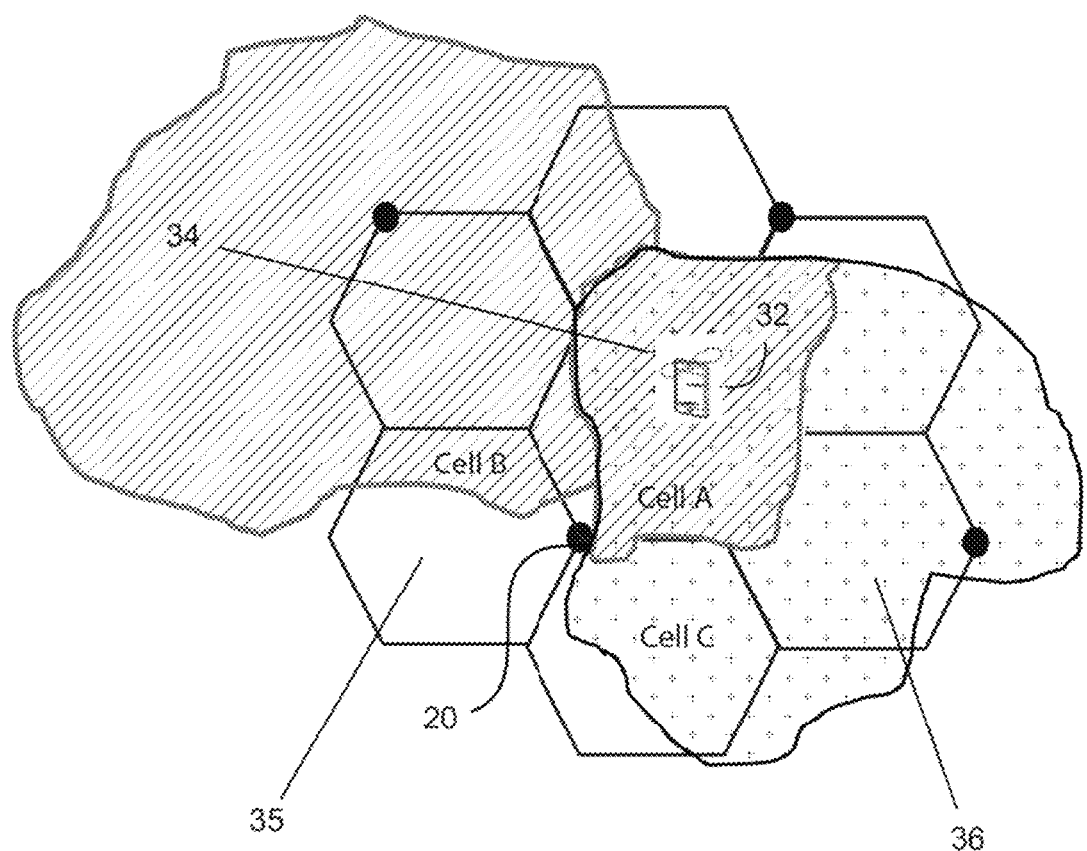
FIG. 3B shows regions in a multi-cell network in accordance with an illustrated embodiment.

FIG. 3B shows the regions in a multi-cell network that may be optimally covered by the two radiation modes of the antenna system 30 (not shown) on the wireless terminal 32. For example, in region 34, the two radiation modes of the of antenna system 30 of the wireless terminal 32 provide equivalent performance. Base station terminals 20 are shown with bolded dots at the junction of cells. For region 35, the first radiation mode provides a specified and better level of performance in this region compared to the second radiation mode. On the other hand, for region 36, the second radiation mode provides a specified and better level of performance in this region.

Figure 4A:
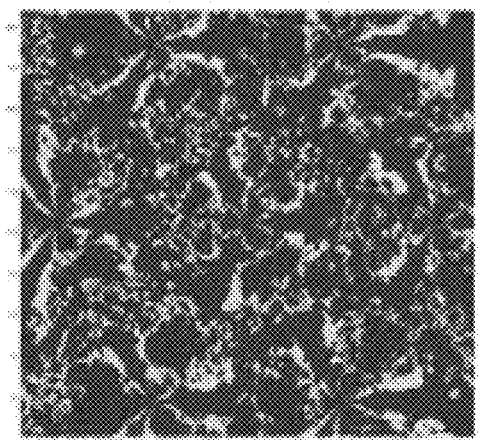
FIG. 4A shows a plot of a cellular network with antenna system performance on a wireless terminal set at a 0 dB baseline in accordance with an illustrated embodiment.
Figure 4B:
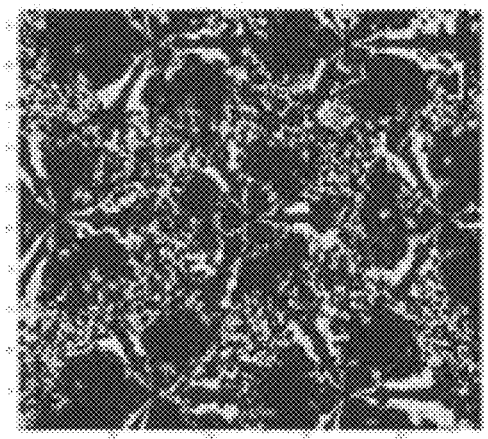
FIG. 4B shows a plot of a cellular network with antenna system performance on a wireless terminal set at a 3 dB improvement level in accordance with an illustrated embodiment.
Figure 4C:
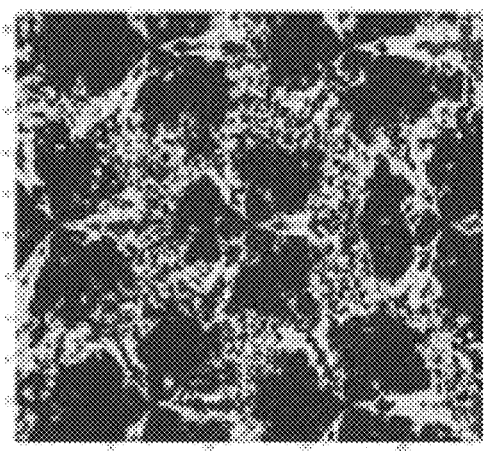
FIG. 4C shows a plot of a cellular network with antenna system performance on a wireless terminal set at a 5 dB improvement level in accordance with an illustrated embodiment.

In some embodiments, one or more devices on a network can be implemented with a modal antenna having multiple radiation modes, the modal antennas of these devices may be used to provide improved antenna efficiency to increase signal strength in a cellular system. For example, FIGS. 4(A-C) illustrate three plots of a same cellular network where antenna system performance on a wireless terminal is respectively set at a 0 dB baseline (FIG. 4A), 3 dB improvement (FIG. 4B), and 5 dB improvement level (FIG. 4C). The figures show regions within the cells of the network that can support various modulation schemes, with the modulation schemes dependent on the signal strength that can be supported or provided at specific locations within the cell. As the antenna system performance on the wireless terminal improves from a 0 dB relative value to 5 dB improvement, the regions within the cells that can support higher orders of modulation (and higher data rates) increases.

Figure 5:
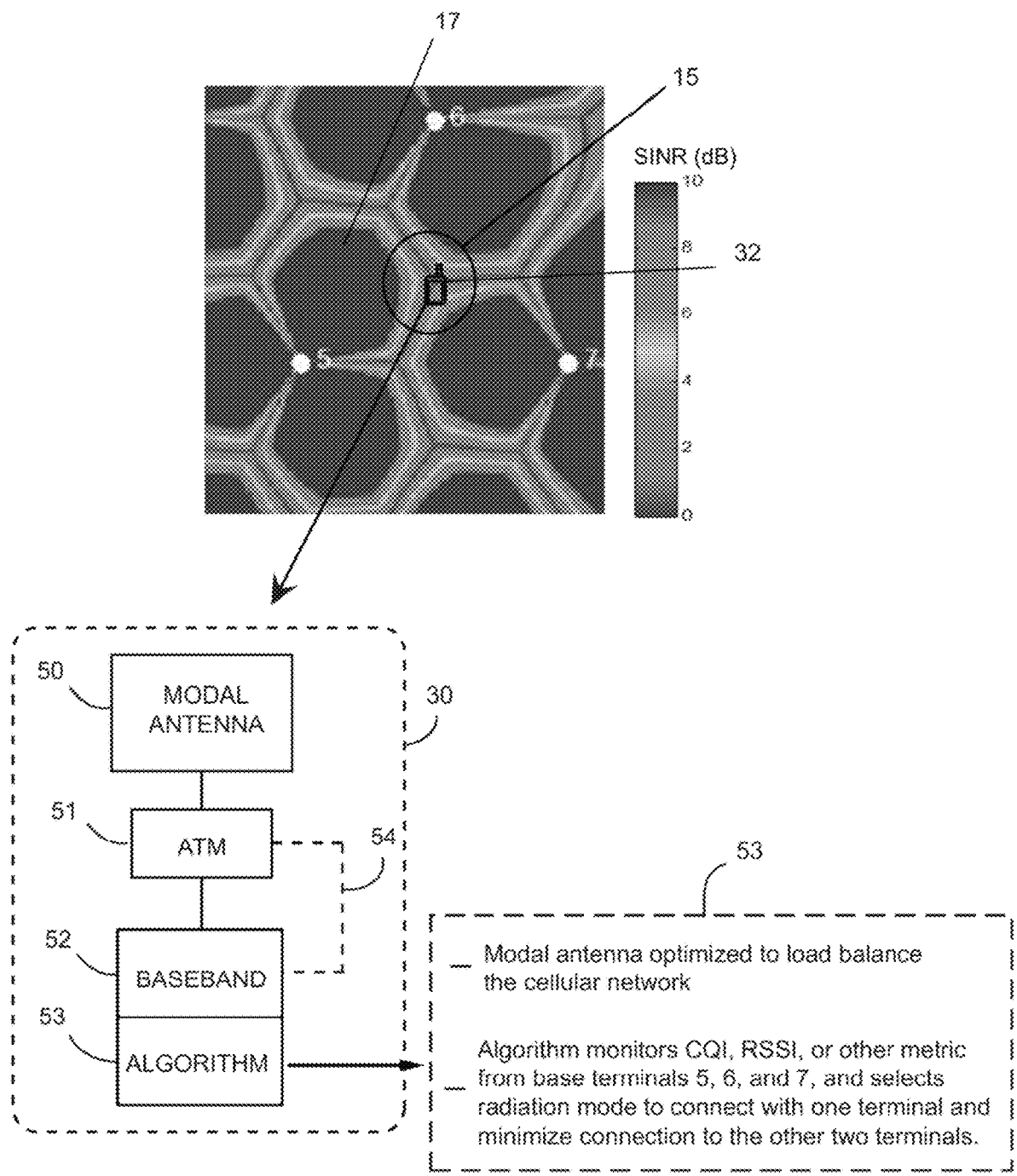
FIG. 5 shows a system on a wireless terminal that uses a modal antenna to optimize load balancing in accordance with an illustrated embodiment.

FIG. 5 illustrates, in accordance with some embodiments, an antenna system 30 on a wireless terminal 32 that uses a modal antenna 50 to optimize load balancing of the network by selecting the best radiation mode from a plurality of possible radiation modes of the modal antenna to a specific cell. In this illustrated embodiment, the wireless terminal 32 is shown in the soft hand-off region 15 (between base terminals 5, 6, and 7). The region 17 has high SINR for base terminal 5. The wireless terminal 32 includes a modal antenna 50, an antenna tuning module (ATM) 51, and an algorithm 53 resident in baseband 52. Control signals are sent from the ATM from baseband. In this exemplary embodiment, the algorithm monitors CQI, RSSI, or other metric from base terminals 5, 6, and 7, and selects a radiation mode of the modal antenna to connect with one terminal and minimize connection to the other two terminals. For example, the selected mode of the modal antenna may produce a gain in the direction of an intended base terminal, and may further produce a null in the direction of one or two base terminals that are not desired for the communication link between the device and the network.

Figure 6A:
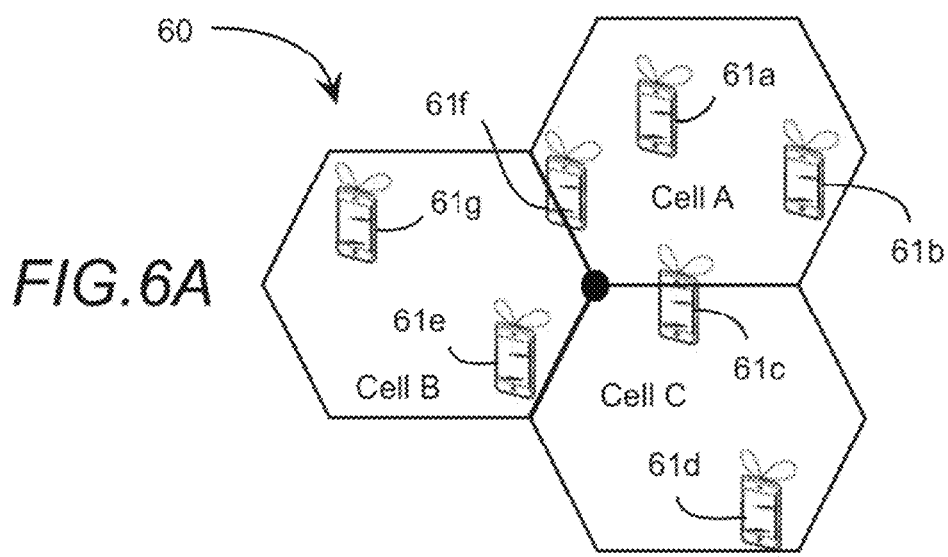
FIG. 6A shows a three-cell network with seven wireless terminals in accordance with an illustrated embodiment.
Figure 6B:
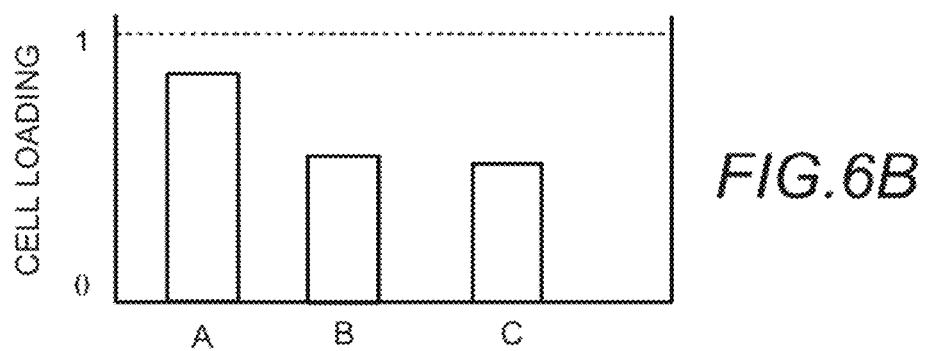
FIG. 6B shows a plot of cell loading for the three cells of FIG. 6A in accordance with an illustrated embodiment.
Figure 6C:
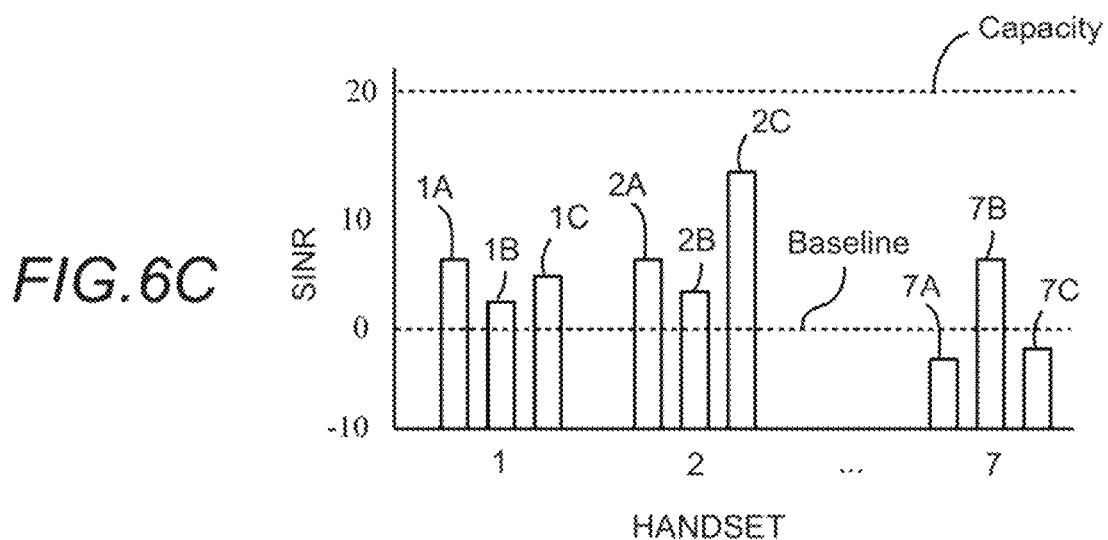
FIG. 6C shows a plot of SINR measured for each wireless terminal for each base terminal of FIG. 6A in accordance with an illustrated embodiment.

FIGS. 6(A-C) illustrate, in some embodiments, a three-cell (A, B, C) network 60 with seven wireless terminals 61a; 61b; 61c; 61d; 61e; 61f; and 61g (i.e., handsets 1 to 7), with these wireless terminals (handsets) possessing passive antennas (fixed radiation pattern). For this illustrated embodiment, a plot of cell loading for the three cells is shown in FIG. 6B, along with a plot of SINR measured for each wireless terminal for each base terminal (cell) shown in FIG. 6C. In FIG. 6B, it is shown that cell A has the highest loading (three of the seven handsets), whereas cells B and C each are loaded with two handsets, respectively. Here, the base station tower can implement beam steering, but as described above, the individual devices include passive (fixed) radiation modes.

Figure 7A:
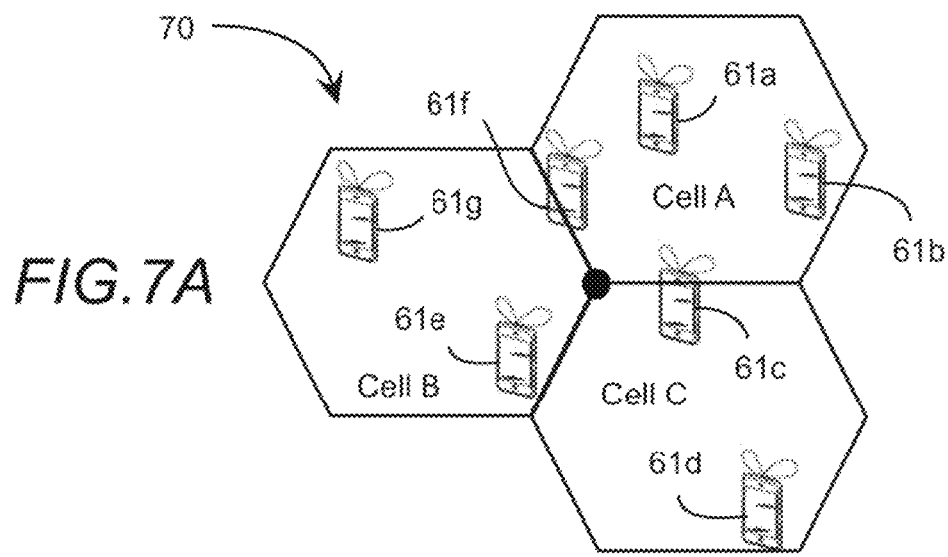
FIG. 7A shows another three-cell network with seven wireless terminals in accordance with an illustrated embodiment.
Figure 7B:
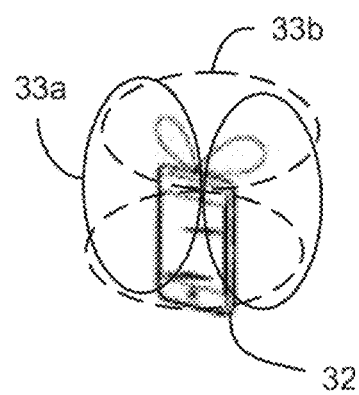
FIG. 7B shows a wireless terminal having modal antenna systems possessing two radiation modes in accordance with an illustrated embodiment.
Figure 7C:
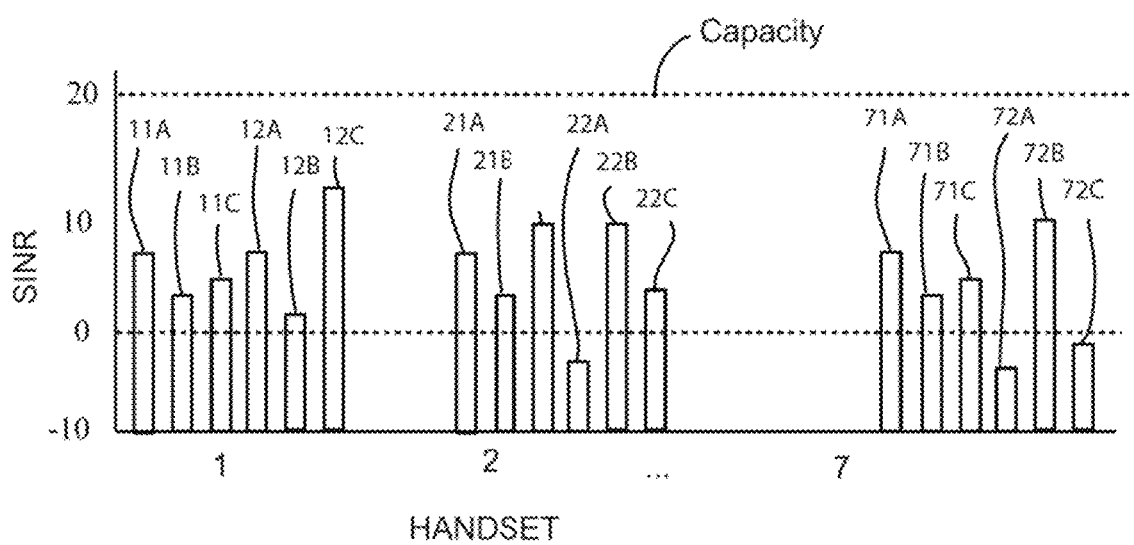
FIG. 7C shows a plot of SINR measured for each radiation mode of the modal antennas for each base terminal of FIG. 7A in accordance with an illustrated embodiment.

FIGS. 7(A-C), in accordance with some embodiments, illustrate a three-cell network 70 with seven wireless terminals 61a; 61b; 61c; 61d; 61e; 61f; and 61g (i.e. handsets 1 to 7), with each of these wireless terminals having modal antenna systems possessing two radiation modes as shown in FIG. 7B, including a first radiation mode 33a and a second radiation mode 33b. For this illustrated embodiment, a plot of SINR measured for each radiation mode of the modal antennas for each base terminal (cell) is shown in FIG. 7C. The network is configured to send control signals through baseband or other similar means in order to command individual devices to vary the mode of the respective modal antenna. For each mode, SINR is sampled, and data is communicated to the network. The network determines globally which devices should be configured with each of the respective base station towers, and which devices are linked in each of the corresponding cells of the network using an algorithm as described herein. Once determined, the network communicates to each device control signals for configuration of the respective modal antenna system. In this regard, load balancing is accomplished through the network sampling device modes and controlling the modes of each device to balance network resources.

Figure 8:
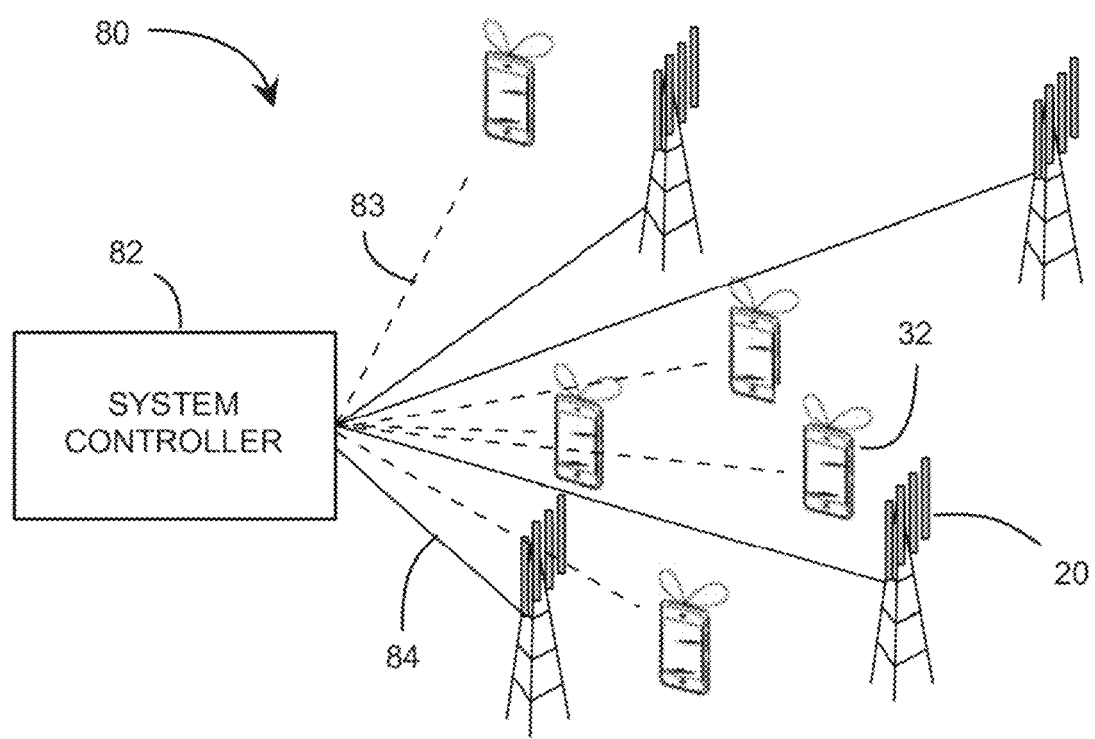
FIG. 8 shows another cellular network with wireless terminals in the network having modal antenna system in accordance with an illustrated embodiment.
Figure 9:
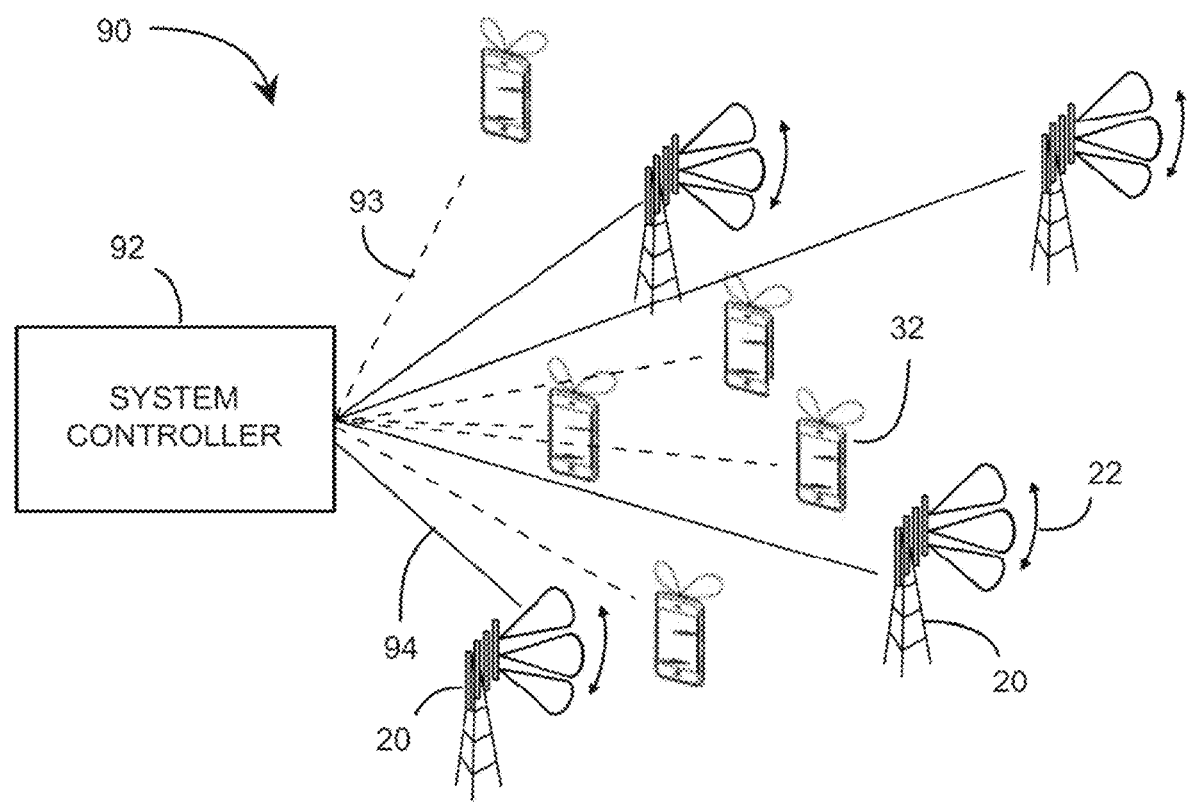
FIG. 9 shows another cellular network with wireless terminals in the network having modal antenna system in accordance with an illustrated embodiment.

FIG. 8 illustrates, in some embodiments, a cellular network 80 with wireless terminals in the network having modal antenna systems, where a system controller 82, including an algorithm, is used to provide commands for the network during a load balancing process. The modal antenna system in each of the wireless terminals may be altered to optimize network loading. FIG. 8 shows control lines between the system controller 82 and the base terminals 84, and wireless links 83 between the system controller and the wireless terminals 32. Although the diagram shows the wireless links coming from the system controller, it should be understood by those with skill in the art that the wireless terminals can connect to the system controller through the base terminals 20. FIG. 9 illustrates, in some embodiments, a cellular network 90 with wireless terminals 32 in the network each having modal antenna system, where a system controller 92, including an algorithm, is used to provide commands for the network during a load balancing process. While in this illustrated embodiment each of the wireless terminals includes a modal antenna, it is possible that some of the wireless terminals may be limited to passive antenna systems. In this illustrated embodiment, both the modal antenna systems in the respective wireless terminals 32 and the base terminals have beam steering antenna systems. The radiation mode in the base terminals may be altered to optimize network loading, and in addition the mode of the wireless terminals may further be altered for optimizing load balancing. FIG. 9 shows control lines 93; 94 between the system controller 92 and the base terminals 20 and the wireless terminals 32. The control lines to the wireless terminals may be wireless connections.

Figure 10:
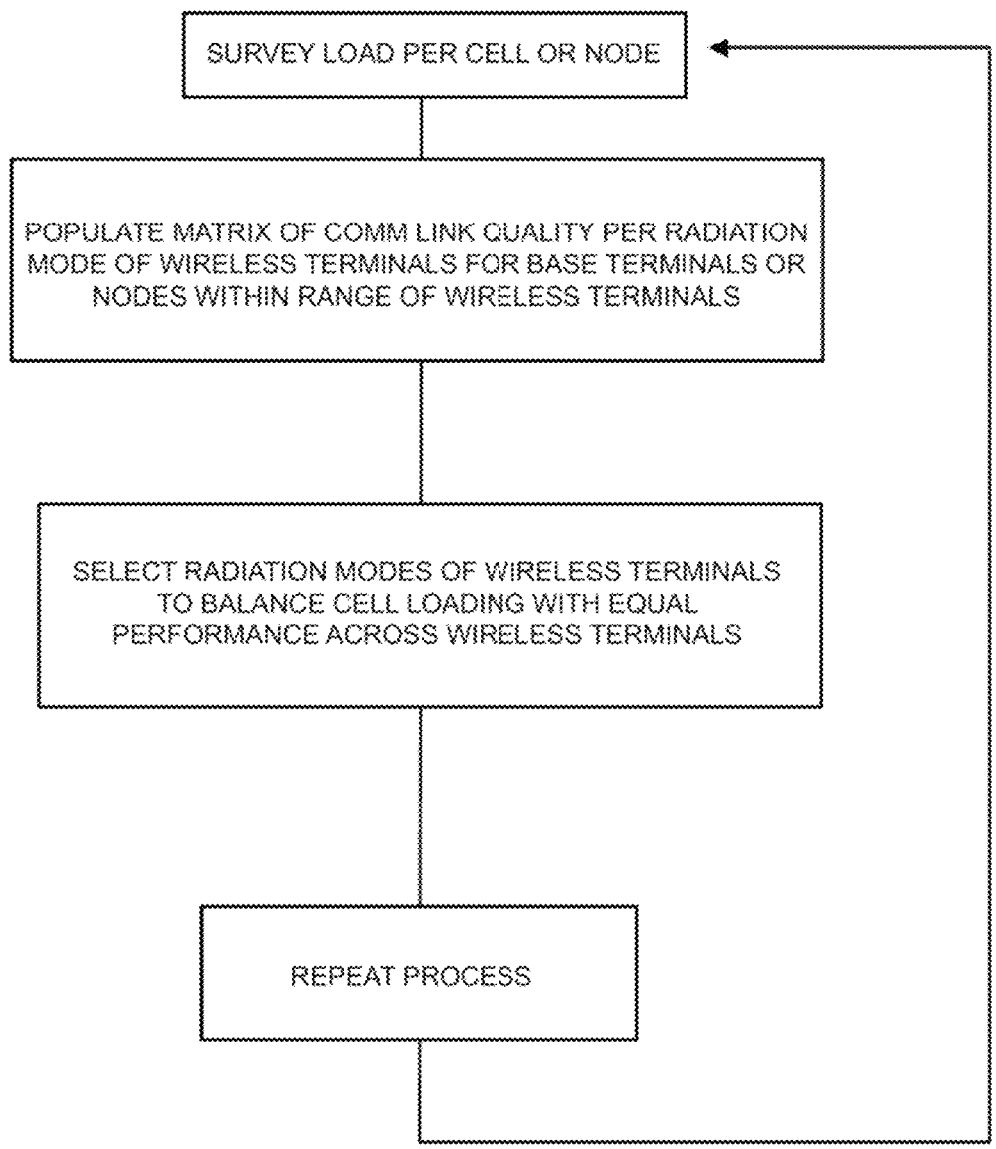
FIG. 10 shows an exemplary flowchart for an algorithm or methodology to load balance a communication network in accordance with an illustrated embodiment.

FIG. 10, in accordance with some embodiments, illustrates an algorithm or methodology 100, included in, for example, a system controller, to load balance a communication network when the wireless terminals in the network include modal antenna systems which allow for a beam steering capability. The base terminals in this illustrated embodiment have passive antenna system. Equal communication link performance is a goal for this process while the network is being balanced. In step 102, the algorithm surveys the load per cell (or node). In step 104, the algorithm populates a matrix of communication link quality per radiation mode of the wireless terminals for the base terminals (or nodes) that are within range of the wireless terminals. In step 106, the algorithm selects radiation modes of the wireless terminals to balance cell loading with equal performance across the wireless terminals. The algorithm then repeats the process at step 102.

In some embodiments, all wireless terminals in the network include antenna systems such that a plurality of radiation modes can be generated for uplink and/or downlink communication, with each radiation mode possessing a different radiation pattern and/or polarization characteristics.

As noted herein, metrics such as SINR, CQI, RSSI, or BER and/or throughput may be used to assign communication link performance. In some embodiments, averages of the metrics (SINR, CQI, RSSI, or BER and/or throughput) may be predicted over a certain period of time before and used to assign communication link performance.

Downlink communication system performance, defined as transmission from one or more base terminals (or nodes) to one or more wireless terminals, may be optimized for network loading across the cells or nodes. Similarly, uplink communication system performance, defined as transmission from one or more wireless terminals to one or more base terminals (or nodes), may be optimized for network loading across the cells or nodes. In some embodiments, both uplink and downlink communication system performance may be optimized for network loading across the cells or nodes.

In some embodiments, the algorithm included in the system controller may be configured to implement a decision process such that a subset of wireless terminals receives preference over other wireless terminals as the load balancing process is applied to the network. The preference of the subset of wireless terminals results in improved communication performance, such as higher data rate, with this preference applied by selecting radiation modes for the wireless terminals in the network that provide improved connections to cells within the network.

Figure 11:
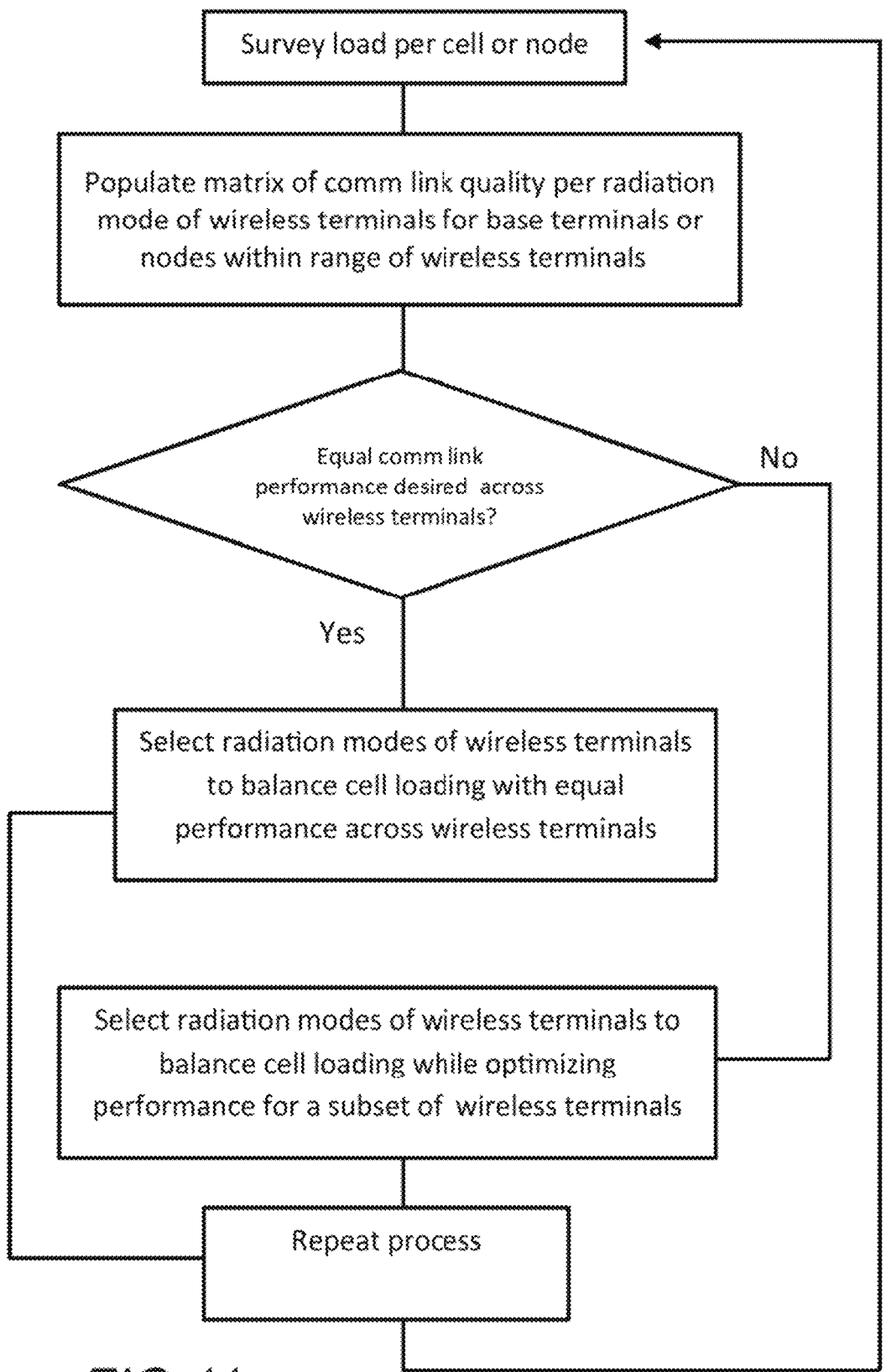
FIG. 11 shows another exemplary flowchart for an algorithm or methodology to load balance a communication network in accordance with an illustrated embodiment.

FIG. 11, in accordance with some embodiments, illustrates an algorithm or methodology 110 to load balance a communication network when the wireless terminals in the network include modal antenna systems which allow for a beam steering capability. The algorithm allows for a determination as to whether to provide equal communication link performance to the wireless terminals or to optimize communication link performance across a subset of the wireless terminals as the network is being balanced. The base terminals in this illustrated embodiment have passive antenna systems. In step 112, the algorithm surveys the load per cell (or node). In step 114, the algorithm populates a matrix of communication link quality per radiation mode of the wireless terminals for the base terminals (or nodes) that are within range of the wireless terminals. In step 116, the algorithm determines whether equal communication link performance is desired across the wireless terminals. If desired, the algorithm proceeds to step 118 to select radiation modes of the wireless terminals to balance cell loading with equal performance across the wireless terminals. The algorithm then proceeds to step 122 and repeats the process at step 112. Back to step 116, if equal communication link performance is not desired across the wireless terminals, the algorithm proceeds to step 120 to select radiation modes of the wireless terminals to balance cell loading while optimizing performance for a subset of the wireless terminals. The algorithm then proceeds to step 122 and repeats the process at step 112. In some embodiments, the communication link performance may thus be equalized across the entire population of wireless terminals in the network as the load balancing process is applied to the network. The process may result in at least an attempt to equalize communication link performance across the population of wireless terminals, with a result being that network resources may be unevenly distributed across the wireless terminals.

Figure 12:
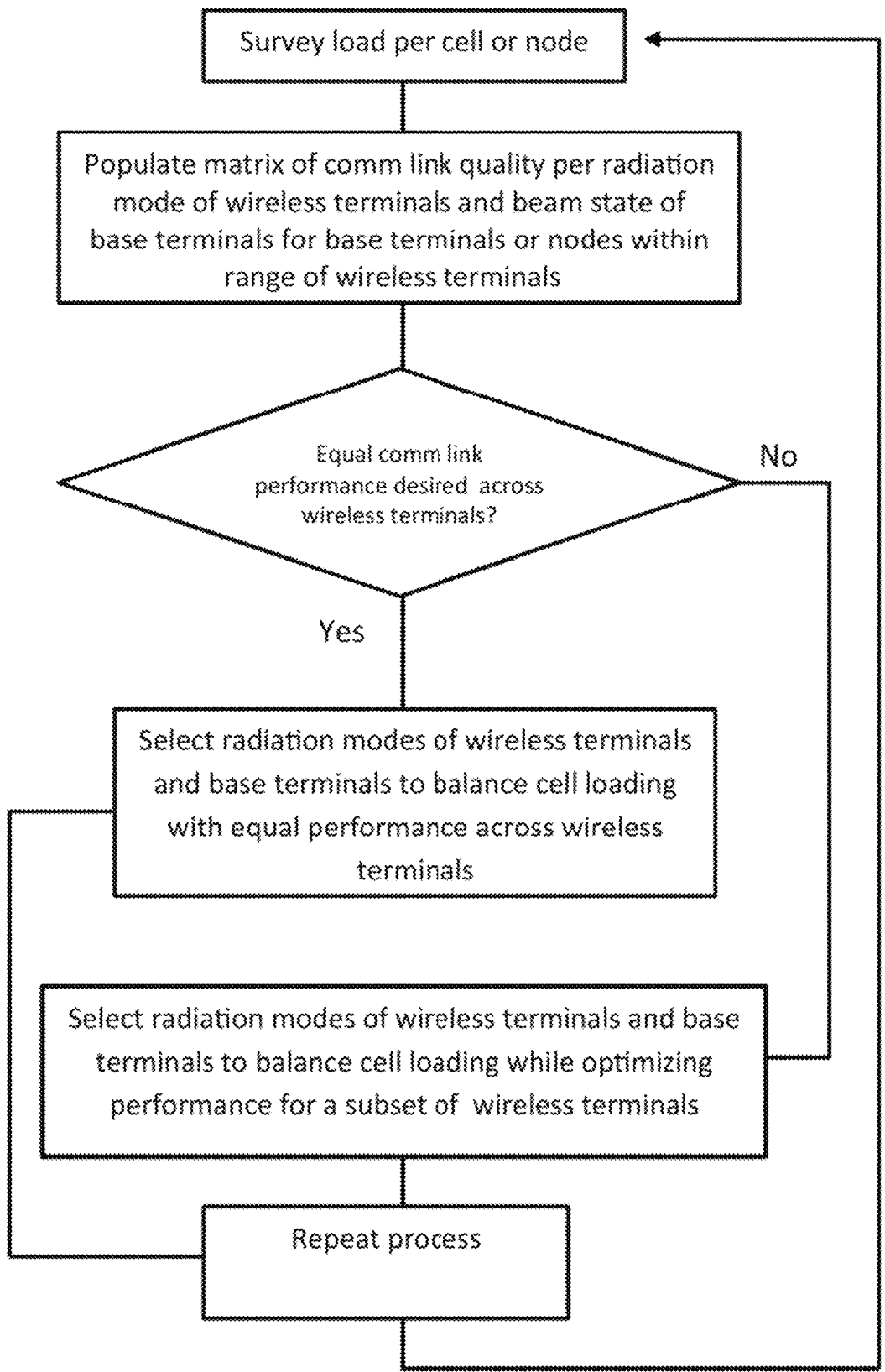
FIG. 12 shows another exemplary flowchart for an algorithm or methodology to load balance a communication network in accordance with an illustrated embodiment.

FIG. 12, in accordance with some embodiments, illustrates an algorithm or methodology to load balance a communication network when the wireless terminals on the network contain modal antenna systems which allow for a beam steering capability and the base terminals have beam steering antenna system. The algorithm allows for a determination as to whether to provide equal communication link performance to the wireless terminals or to optimize communication link performance across a subset of the wireless terminals as the network is balanced. In step 132, the algorithm surveys the load per cell (or node). In step 134, the algorithm populates a matrix of communication link quality per radiation mode of the wireless terminals and beam state of the base terminals for the base terminals (or nodes) that are within range of the wireless terminals. In step 136, the algorithm determines whether equal communication link performance is desired across the wireless terminals. If desired, the algorithm proceeds to step 138 to select radiation modes of the wireless terminals and the base terminals to balance cell loading with equal performance across the wireless terminals. The algorithm then proceeds to step 142 and repeats the process at step 132. Back to step 136, if equal communication link performance is not desired across the wireless terminals, the algorithm proceeds to step 140 to select radiation modes of the wireless terminals and base terminals to balance cell loading while optimizing performance for a subset of the wireless terminals. The algorithm then proceeds to step 142 and repeats the process at step 132.

Similar to the descriptions above for FIG. 10, for the algorithm or methodology of FIG. 12, in some embodiments, all wireless terminals in the network include antenna systems such that a plurality of radiation modes can be generated for uplink and/or downlink communication, with each radiation mode possessing a different radiation pattern and/or polarization characteristics. Metrics such as SINR, CQI, RSSI, or BER and/or throughput may be used to assign communication link performance. In some embodiments, averages of the metrics (SINR, CQI, RSSI, or BER and/or throughput) may be predicted over a certain period of time before and used to assign communication link performance. Downlink communication system performance, defined as transmission from one or more base terminals (or nodes) to one or more wireless terminals, may be optimized for network loading across the cells or nodes. Similarly, uplink communication system performance, defined as transmission from one or more wireless terminals to one or more base terminals (or nodes), may be optimized for network loading across the cells or nodes. In some embodiments, both uplink and downlink communication system performance may be optimized for network loading across the cells or nodes. In some embodiments, the algorithm residing in the system controller may be configured to implement a decision process such that a subset of wireless terminals receives preference over other wireless terminals as the load balancing process is applied to the network. The preference of the subset of wireless terminals results in improved communication performance, such as higher data rate, with this preference applied by selecting radiation modes for the wireless terminals in the network that provides improved connections to cells within the network. In still some other embodiments, the algorithm may be configured to implement a decision process such that communication link performance is equalized across the entire population of wireless terminals on the network as the load balancing process is being applied to the network. The process results in an attempt to equalize communication link performance across the population of wireless terminals, with a typical result being that network resources are unevenly distributed across the wireless terminals.

As noted herein, in some embodiments, in a network where one or more wireless terminals with beam steering antenna systems capable of generating multiple radiation modes is implemented, the network possesses a fault correction mode where radiation modes for wireless terminals are selected to off-load a cell or node that has a failure or partial failure mechanism. A system controller, comprised of a processor and an algorithm, may be part of the network and provides the control and monitoring function for the wireless terminals. When a fault is detected with hardware associated with a cell in the network that can affect communication link performance between the cell and the wireless terminals, the controller with the algorithm may implement a failure correction mode where subscribers are off-loaded to adjacent or other cells. The antenna beam steering systems associated with the subscribers are surveyed by the controller, and antenna beam steering mode and cell pairings are implemented to avoid use of the cell containing the fault.

What is claimed is:

1. A method of load balancing in a communications network comprising a system controller, a plurality of base terminals, and a plurality of wireless client devices, at least one wireless client device of the plurality of wireless client devices comprising a modal antenna configurable in a plurality of radiation modes, the method comprising:
    surveying, by the system controller, communication link performance between the at least one wireless client device and one or more base terminals of the plurality of base terminals when the modal antenna of the at least one wireless client device is configured in each of the plurality of radiation modes, wherein each of the plurality of radiation modes has a different radiation pattern; and
    selecting, by the system controller, one of the plurality of radiation modes as a selected mode for the modal antenna of the at least one wireless client device to load balance the communications network based, at least in part, on the communication link performance between the at least one wireless client device and the one or more base terminals when the modal antenna of the at least one wireless client device is configured in each of the plurality of radiation modes,
    wherein in the selected mode:
        downlink communication performance is improved relative to uplink communication performance for one or more of the plurality of base terminals; or
        uplink communication performance for one or more base terminals of the plurality of base terminals is improved relative to downlink communication performance for the one or more base terminals.

2. The method of claim 1, wherein selecting one of the plurality of radiation modes as a selected mode for the modal antenna of the at least one wireless client device comprises selecting, by the system controller, a first mode of the plurality of radiation modes as the selected mode for downlink communications involving one or more of the base terminals.

3. The method of claim 2, wherein selecting one of the plurality of radiation modes as a selected mode for the modal antenna of the at least one wireless client device comprises selecting, by the system controller, a second mode of the plurality of radiation modes as the selected mode for uplink communications involving one or more of the base terminals, the second mode being different than the first mode.

4. The method of claim 1, wherein when the modal antenna of the at least one wireless client device is configured in selected mode, a priority of communications involving the at least one wireless client device having the modal antenna and one or more base terminals of the plurality of base terminals is higher than a priority of communications involving another wireless client device of the plurality of wireless client devices and the one or more base terminals.

5. The method of claim 1, further comprising:
    determining, by the system controller, whether communication link performance needs to be equalized across the plurality of wireless client devices.

6. The method of claim 1, wherein communication link performance is based on at least one of signal-to-interference noise ratio (SNIR), receive signal strength indicator (RSSI), bit error rate (BER).

7. The method of claim 1, wherein:
    the one or more base terminals include a first base terminal and a second base terminal; and
    in the selected mode, a gain of the radiation pattern of the modal antenna is pointed towards the first base terminal and a null of the radiation pattern is pointed towards the second base terminal.

8. A system controller for a communications network comprising a plurality of base terminals and a plurality of wireless client devices, at least one of the plurality of wireless client devices comprising a modal antenna configurable in a plurality of radiation modes, the system controller comprising:
    one or more processors configured to:
        survey communication link performance between the at least one wireless client device and one or more base terminals of the plurality of base terminals when the modal antenna of the at least one wireless client device is configured in each of the plurality of radiation modes, wherein each of the plurality of radiation modes has a different radiation pattern; and
        select one of the plurality of radiation modes as a selected mode for the modal antenna of the at least one wireless client device for at least one of uplink communications and downlink communications to load balance the communications network based, at least in part, on the communication link performance between the at least one wireless client device and the one or more base terminals when the modal antenna of the at least one wireless client device is configured in each of the plurality of radiation modes,
    wherein in the selected mode:
        downlink communication performance is improved relative to uplink communication performance for one or more of the plurality of base terminals; or
        uplink communication performance for one or more base terminals of the plurality of base terminals is improved relative to downlink communication performance for the one or more base terminals.

9. The system controller of claim 8, wherein the system controller is configured to:

select a first mode of the plurality of radiation modes as the selected mode for downlink communications involving one or more of the base terminals; and select a second mode of the plurality of radiation modes as the selected mode for uplink communications involving the one or more base terminals.

10. The system controller of claim 9, wherein the second mode is different than the first mode.

* * * * *